Patented Aug. 8, 1939

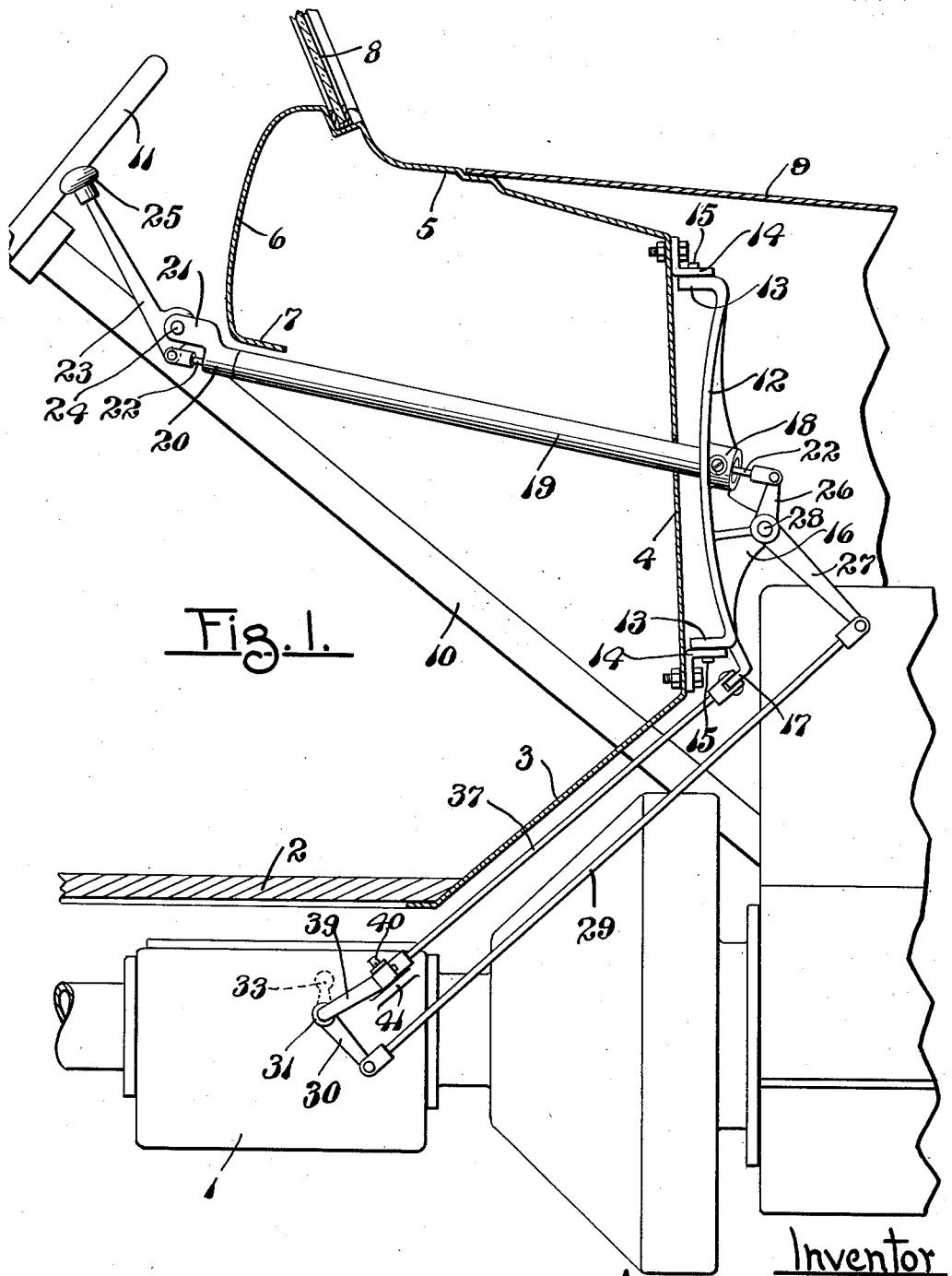

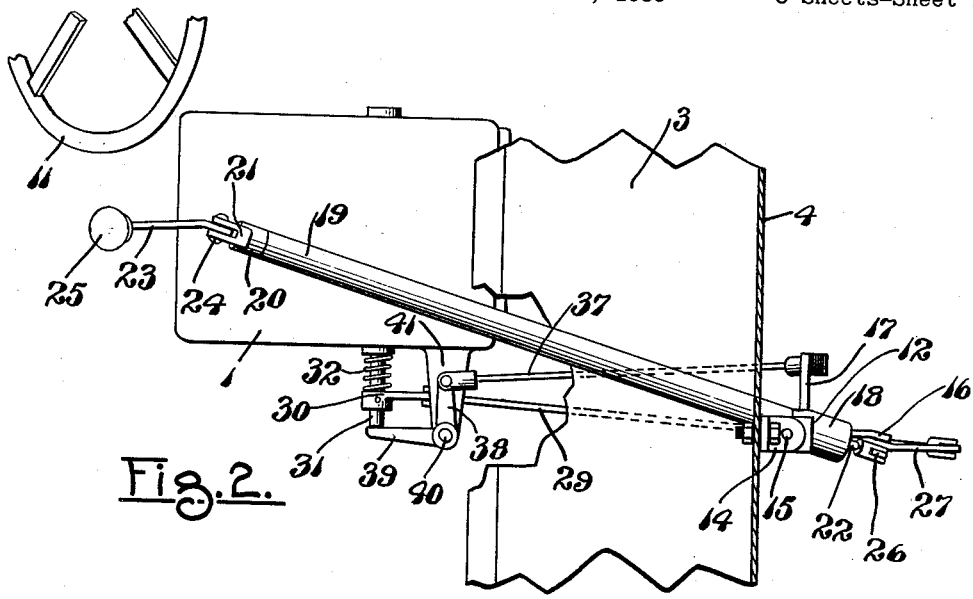
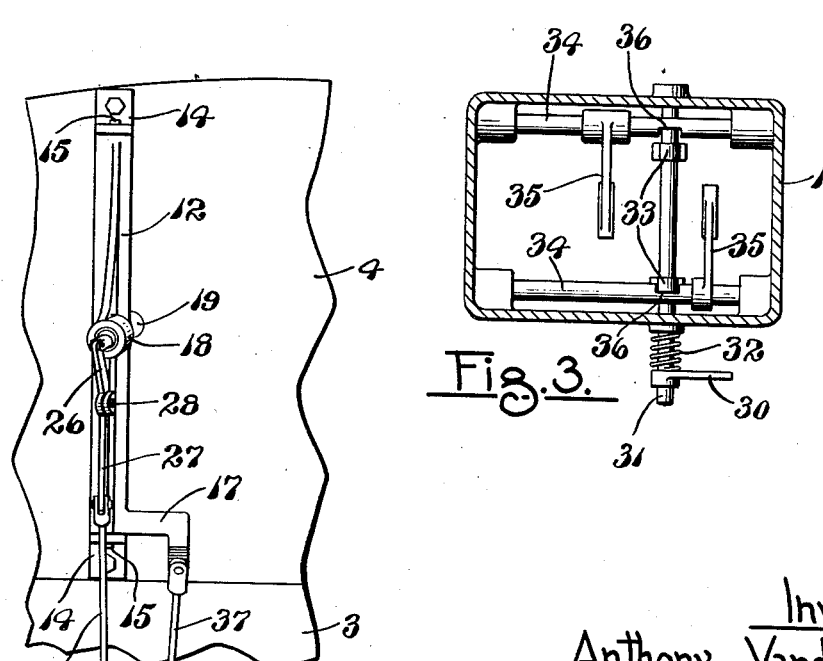

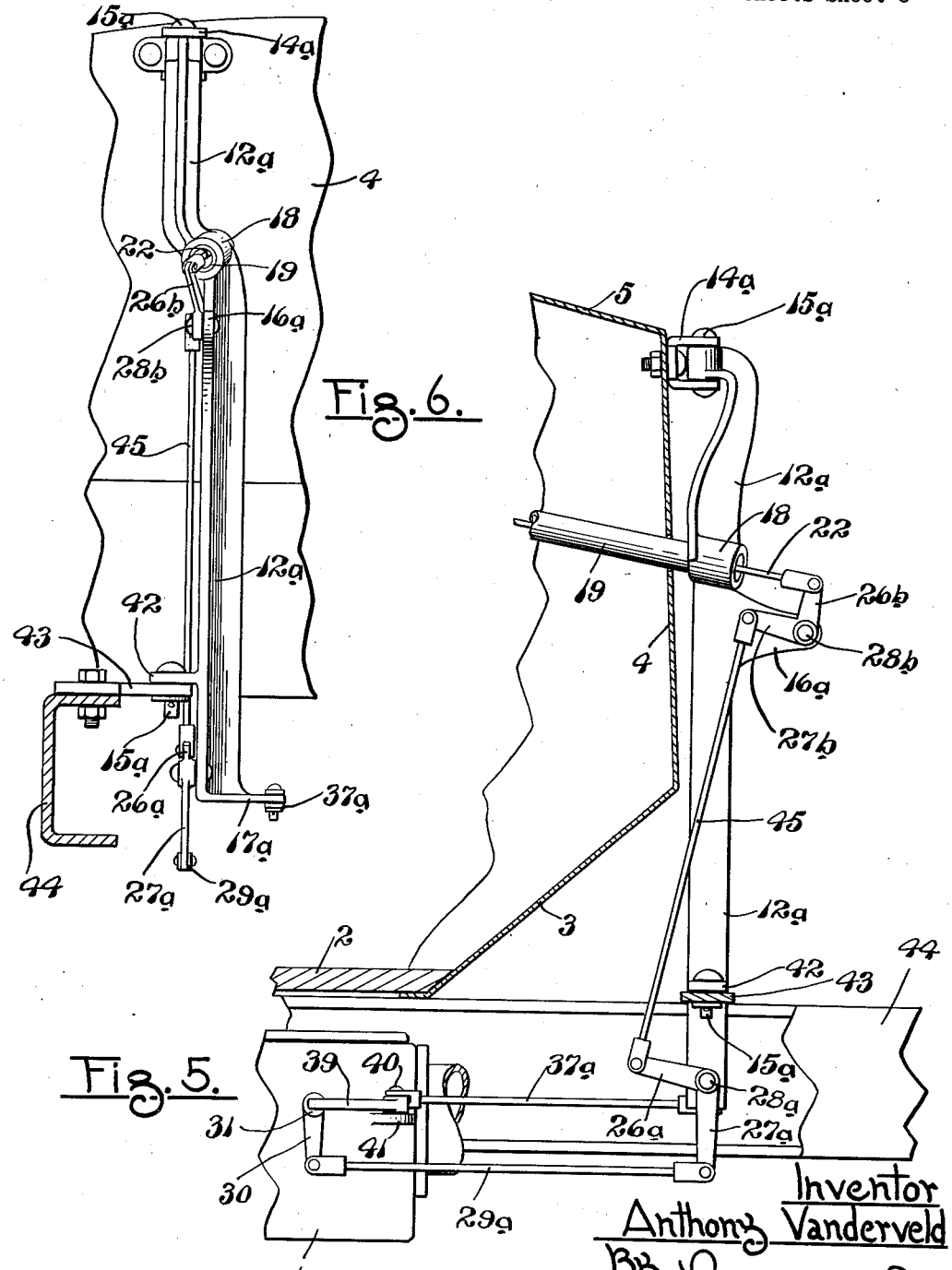

2,169,034

UNITED STATES PATENT OFFICE 2,169,034

GEAR SHIFTING MECHANISM

Anthony Vanderveld, Grand Rapids, Mich.

Application January 23, 1939, Serial No. 252,270

8 Claims. (Cl. 74—473)

This invention relates to gear shifting in motor vehicles and is concerned with many improvements and simplifications with respect to the invention disclosed in my previously filed application, Serial No. 189,157, filed February 7, 1938.

A beneficial result which it is an object and purpose of the present invention to attain, is to mount the manually operable means which is used for shifting the gears in the front or driving compartment of the motor vehicle so that it does not interfere in any manner with the space to be occupied by occupants of said front compartment, and at the same time operate the shifting mechanism by following exactly the same movements as are now followed with the ordinary gear shifting lever which in practice extends upwardly from the transmission gearing substantially at the central portion of the front or driving compartment of the motor vehicle and thus obstructs the space therein. This object and purpose is common both to the present invention and to that disclosed in my previously filed application.

The present invention is also applicable to a type of sliding gear transmission which is used largely with a structure of gear shifting mechanism which has come into recent use, in which the selecting and shifting lever is disposed horizontally underneath the steering wheel of the motor vehicle. Therefore, the invention as embodied in the disclosure of this application may be very conveniently applied to motor vehicles which have or are provided with transmission gearings designed for such gear shifting without necessity of designing and building a sliding gear transmission specifically for use with my invention. My invention is interchangeable with that above noted and can be used in its place without expense which would be required in designing a new or special type of transmission gearing to go with it.

Furthermore, the present invention is an improvement over that shown in my previously filed application in that it eliminates any location of parts of the mechanism of the invention within the lower portion of the front driving compartment of the motor vehicle, and further such parts of the mechanism as are in the driving compartment are lifted to a high position above the floor boards, making available more space and rendering the driving compartment free and unobstructed.

The invention may be understood from the following description, taken in connection with the accompanying drawings, in which:

Fig. 1 is a vertical section and side elevation showing the gear shifting appliance of my invention in its operative connection and assembly with the body of a motor vehicle and its relation and connection to the transmission gearing, the dash and the instrument panel of said body.

Fig. 2 is a plan view with parts broken away and in section of the invention applied to the transmission gearing as in Fig. 1.

Fig. 3 is a horizontal section through the transmission gearing casing showing the shifting rods thereof in plan.

Fig. 4 is a front elevation of such parts of the mechanism as are located in front of the dash of the vehicle body.

Fig. 5 is a fragmentary section and side elevation similar to Fig. 1, showing some modifications in structure but, however, illustrating a directly equivalent construction, and Fig. 6 is a view similar to Fig. 4 of the parts of the mechanism of my invention located in front of the dash of the vehicle body.

Like reference characters refer to like parts in the different figures of the drawings.

The transmission gearing of the selective sliding gear type is housed within the usual transmission housing 1 which is located below the horizontal floor boards 2 of the front or driving compartment of the vehicle body. From the front edges of the horizontal floor boards 2 an upwardly and forwardly inclined floor section 3 may extend for a distance and then extend upwardly as at 4 to provide a vertical dash, which is continued rearwardly as the cowl 5 of the body, terminating in an instrument board or panel 6 having a forwardly turned terminal flange 7. The usual windshield 8 extends upwardly and to the rear substantially at the juncture of the cowl and instrument panel. Likewise the cowl is partly covered by the rear portions of the usual hood 9 which covers the power plant of the vehicle. The motor vehicle has a steering post 10 with a steering wheel 11 at its upper end positioned at the left of the front driving compartment. The structure thus described in general is common to all motor vehicles driven by internal combustion engines or like power plants and is the environment in which my invention is to be used.

With my invention at the front side of the vertical dash portion 4 of the body a bracket 12 is positioned substantially vertically having rearwardly turned upper and lower ends 13 from which pivot pins 15 extend through the horizontal legs of angle brackets 14 fixed to the dash 4 adjacent its upper and lower edges. The axes of the pins 15 are in substantially vertical alinement. The bracket 12 is adapted to be turned about the common vertical axis of said pins. Said bracket 12 near its lower portion has a forwardly projecting boss 16. At its lower end it has a laterally extending arm 17 integral therewith, the free end portion of which is turned downwardly and to the rear, as shown in Figs. 1 and 4. And immediately above the boss 16 the bracket 12 is provided with a sleeve 18, the central axis of which inclines upwardly and to the rear.

A tubular housing 19 has its lower end received within the sleeve 18 and is fixed therein by a set screw or other equivalent secure fastening means. The housing 19 extends upwardly and to the rear, passing through the dash 4 and having its rear end portion closely adjacent the terminal flange 7 of the instrument panel 5. A sleeve 20 inserted in the upper end of the housing 19 and fixed with relation thereto projects rearwardly from said housing and is formed with an off-set upwardly positioned arm 21 located in a plane a short distance above the upper side of the housing 19.

A rod 22 extends lengthwise through the sleeve 20 and the housing 19 and at its upper rear end is pivotally connected to the lower end of a manually operable lever 23 which is pivoted at 24 a short distance above its lower end on the arm 21, the free upper end of the lever 23 being equipped with the knob 25 to be engaged by the hand of the driver. It is evident that the driver engaging the knob 25 by applying a lateral pressure may swing the bracket 12 about the vertical axis of the pins 15, the direction of swinging movement corresponding to the direction of the pressure applied to the knob 25.

The lower front end of the rod 22 is pivotally connected to the upper end of a substantially vertical arm 26 of a bell crank lever, the other arm 27 of which extends downwardly and forwardly. Such bell crank lever is mounted on a pivot pin 28 on the forwardly extending boss 16 integral with the bracket 12. A rod 29 is pivotally connected at its front upper end to the lower end of the arm 27 and extends downwardly and to the rear substantially parallel to the plane of the inclined front portion 3, at its lower end being pivotally connected to the outer end of an arm 30 secured at its inner and upper end to a rock shaft 31 which extends through the transmission housing 1 and has a rotative mounting in bearings in the opposite vertical sides of said housing.

A coiled compression spring 32 surrounds the outer portion of the rock shaft 31 between the adjacent side of the transmission casing 1 and the arm 32. Two arms 33 are connected to the rock shaft 31 within the casing 1 and extend upwardly at the inner sides of horizontal slidably mounted shifting rods 34 which extend lengthwise of, are located within, and are carried by bosses at the corners of the transmission casing in substantially parallel relation to the sides of the casing. Each of the rods 34 carries a yoke 35 which connects with a shiftable or sliding gear of the transmission which is to be shifted, said gears not being shown as the construction of gearing in transmissions of this kind is old and well-known to those familiar with the art. The rods 34 at their inner sides have each a vertical notch or recess 36 therein, the upper ends of the adjacent arms 33 being adapted to be received in said recesses one at a time. That is, normally under the influence of the spring 32 the rock shaft 31 is moved in a direction such that the arm 33 will be received within the recess of the lower rod 34, shown in Fig. 3, but at the same time the opposite arm 33 is moved away from the recess 36 in the upper arm 34 which is shown in Fig. 3. But on moving the rock shaft 31 longitudinally against the force of the spring 32, the first arm 33 which has been engaged in the recess 36 of its adjacent rod 34 will be moved out of engagement with said recess 36, while the other arm 33 will be moved toward the notch or recess 36 of the opposite upper rod 34 and if moved far enough will enter said recess. In any case, for either arm 33 to enter a recess 36 of the sliding rod 34 with which it is to cooperate, said arms, in the structure shown, must be substantially vertical and the gearing of the transmission gearing be in neutral position.

A rod 37 is pivotally connected at its upper forward end to the end of the arm 17 which has been previously described as integral with the bracket 12. The rod 37 extends downwardly and to the rear substantially paralleling the rod 29 and at its lower end has a pivotal connection to one arm 38 of a bell crank lever, the other arm 39 of which bears against the outer end of the rock shaft 31 (Fig. 2). Such bell crank lever is pivotally mounted on a pivot pin 40 carried by a bracket 41 which may be cast integral with and extend outwardly from the adjacent vertical side of the transmission housing 1.

With the construction described, normally the spring 32 will move the rock shaft 31 in one direction so as to engage one of the arms 33 in the notch 36 of one of the shifting rods 34, as in Fig. 3. This shifting rod when actuated controls the usual and conventional standard sliding gear shift to provide selectively the second and third forward speeds, or as it is otherwise known, the intermediate and high speeds of driving the motor vehicle. When in such position with the gearing at neutral, the lever 23 occupies substantially the position shown in Fig. 1. From such position it may be pivotally moved either in a forward direction toward the instrument panel 6 or in a backward direction farther away therefrom. Movement in the forward direction will actuate the rod 22 and through the connections between said rod and the arm 30 the rock shaft 31 will be rocked in a counterclockwise direction (Figs. 1 and 3), moving the rod 34 which is engaged with one of the arms 33 rearwardly and thus effect the intermediate or second forward speed driving connection. When the lever 23 is operated in the opposite direction the rod 34 will be moved oppositely or in a forward direction for getting high or third speed. For the other speeds which are obtained by shifting the rock shaft 31 longitudinally to connect the other arm 33 with the opposite rod 34, a lateral pressure is placed against the side of the upper end of the lever 23 whereby the tubular housing 19 and the bracket 12 turn about the vertical axis of the pins 15, the pressure on the knob 25 being toward the steering wheel. This causes the arm 17 to be swung clockwise (Fig. 2) and thus operate the arm 39 of the bell crank lever to press inwardly against the end of the rock shaft 31 and move it against the compression of spring 32 to the position where the opposite arm 33 engages with the other shifting rod 34. Then by manually moving the lever 25 in either a forward or rearward direction about the pivot 24, a connection of gearing for obtaining reverse or first speeds may be obtained.

In Figs. 5 and 6 the form of construction shown is equivalent in substantially all respects to that previously described. The bracket 12a which takes the place of the bracket 12, is pivotally mounted at its upper end on a pivot pin 15a, carried by a supporting member 14a attached to the dash 4. At its lower end the bracket 12a extends downwardly to and beyond the upper side of the chassis frame and has a lateral lug 42 pivotally connected by a lower pivot pin 15a with a plate 43, which is bolted or otherwise secured to the adjacent side chassis frame member 44, the two pivots 15a being in vertical alinement. Thus the bracket 12a may be turned about said pivots the same as the bracket 12, the tubular housing 19 being mounted on the bracket 12a in the same manner as in the first described structure. The arm 17a at the lower end of the bracket 12a is connected by a rod 37a with the arm 38 of the bell crank lever, the other arm 39 of which engages against the outer end of the rock shaft 31, whereby the pivotal movement imparted to the bracket 12a by a lateral pressure against the knob 25 of lever 23 effects an inward movement of the rock shaft 31a in the same manner as previously described. For rocking the rock shaft 31, a rod 29a, taking the place of the rod 29, is connected to the lower end of the arm 30 at its rear end and at its front to the lower end of an arm 27a of a bell crank which is pivoted at 28a adjacent the lower end of the bracket 12a. The other arm 26a of this bell crank is connected by a rod 45 with the arm 27b of an upper bell crank lever which is pivoted at 28b on a projecting arm 16a extending forwardly from the bracket 12a. The rod 22 which passes lengthwise through the tubular housing 19 is connected to the upper end of the other arm 26b of the upper bell crank. The operation in all respects is the same as previously described. This construction may have some advantages in eliminating vibrational effects. The rods 37a and 29a are horizontal, where the equivalent rods 37 and 29 in the first described structure are inclined at an angle of approximately 45° to the horizontal.

The structures described are economical to produce from a manufacturing standpoint and are readily applied to the transmission gearing of the type described and which in itself is a relatively common form of sliding gear transmission now in considerable use. The space in the front driving compartment of a motor vehicle is, for all practical purposes, wholly unobstructed. The operation of the gear shift appliance of my invention follows exactly the same routine and motions heretofore followed with gear shift levers directly attached to and extending upwardly from the transmission casing. The lever 23 is disposed slightly to one side of the steering wheel 11 (Fig. 2) and is instantly accessible by the right hand of the driver. Its movements are at a position high enough in the body of the motor vehicle that in no movement of the lever 23 does any part of it come below the level of the lowermost portion of the steering wheel, and in general never below the level of the lower edges of the instrument panel.

The construction is strong and sturdy, may be produced economically, the assembly of the parts is simple and easy and the application to motor vehicles and the sliding gear transmissions in use is very easily accomplished.

The invention is defined in the appended claims and is to be considered comprehensive of all forms of structure coming within their scope.

I claim:

1. A gear shifting appliance for selecting and shifting slidable gears in a sliding gear transmission of a motor vehicle comprising, a support having a laterally extending member, means for mounting said support to turn about a substantially vertical axis located in front of and above the transmission gearing, an elongated member secured to said support between its ends and extending rearwardly therefrom, a rod connected to said laterally extending member extending downwardly adjacent the transmission gearing, means operated by said rod when said support is swung in one direction for making connection between a gear of the transmission to be shifted and an operating means therefor, a bell crank lever mounted on said support, a second rod connection between one arm of the bell crank lever and said operating means for shifting the gear, and a third rod connected to the other arm of said bell crank lever and extending rearwardly therefrom, combined with means pivotally mounted upon the elongated member connected to said third rod for longitudinally moving said third rod to operate the bell crank lever as specified.

2. A gear shifting appliance for selecting and shifting sliding gears of a transmission gearing comprising, a support having a laterally extending arm, means for mounting said support to turn about a substantially vertical axis, an elongated member attached to said support and extending rearwardly therefrom, a bell crank lever mounted on the support, rods, one connected to said arm and the other to one end of the bell crank lever, means operated by the rod connected to said arm of the support for controlling the selection of the gear to be operated upon movement of said support about its pivotal mounting, means connecting the other of said rods with mechanism of the sliding gear transmission which will shift the selected gear upon pivotal movement of the bell crank lever, and manually operable means connected to the other end of said bell crank lever and also movably connected to the rear end of said elongated member, the operation of which in opposite directions pivotally turns said bell crank lever in opposite directions, as specified.

3. In a motor vehicle having a body with a driving compartment which has a dash at the front thereof, and said motor vehicle having a selective sliding gear transmission below said driving compartment, of a supporting bracket pivotally mounted on the dash to turn about a substantially vertical axis, an elongated member secured at its front end to said bracket and extending rearwardly therefrom, a lever pivotally mounted between its ends at the rear end of said elongated member, a rod connected to one end of said lever extending forwardly in substantial parallelism to said elongated member, means connected with said bracket and with said transmission gearing for effecting a selection of a gear to be shifted on turning the bracket about its pivotal mounting, and means mounted on the bracket connected with said rod and also connected with the transmission gearing for shifting the selected gear on pivotal operation of the lever, as specified.

4. An attachment to be connected with a sliding gear transmission and the body of a motor vehicle comprising, a substantially vertical bracket, means at its ends adapted to be mounted on a motor vehicle body for pivotally mounting the bracket to turn about a substantially vertical axis, an elongated member connected to said bracket and adapted to extend rearwardly therefrom when the bracket is vertically positioned, a bell crank lever pivotally mounted on the bracket to turn about a horizontal axis, a second lever pivotally mounted between its ends at the rear end of said elongated member, a rod connecting one end of said lever with one end of the bell crank lever, an arm extending laterally from the bracket, and two additional rods, one connected to the other end of the bell crank lever, and the other connected to said arm, said two additional rods being adapted to extend to and have operative connection to the gear shift mechanism for the purposes specified.

5. A gear shifting attachment of the class described comprising, a bracket adapted to be located vertically, pivot supports therefor at its ends for mounting the bracket to turn about a substantially vertical axis, an elongated member connected at one end with said bracket and extending therefrom, the other end of said elongated member being adapted to have lateral pressure applied thereto to turn the bracket about its pivotal axis, a lever pivotally mounted at said other end of the elongated member, a rod pivotally connected to one end of said lever substantially paralleling said elongated member, a second lever pivotally mounted on said bracket to turn about a horizontal axis, said rod being connected to one end of said second lever, a second rod pivotally connected to the other end of said lever, and a third rod connected with said bracket adjacent its lower end and to one side of the vertical axis thereof, whereby turning said bracket about its pivotal axis will move said third rod longitudinally, as and for the purposes specified.

6. An attachment adapted to be applied to a sliding gear transmission, which transmission comprises a gear housing, two parallel rods slidably mounted thereon, each with a notch in the side thereof adjacent the other rod, and a rock shaft extending through said housing mounted for rotative and longitudinally slidable movements with arms extending from said rock shafts adapted to selectively seat in said notches of the sliding rods on moving the rod longitudinally, said transmission also including a spring for normally moving the rod in one direction to seat one of said arms in the notch of one of said sliding rods, said attachment comprising, a pivotally movable support mounted to turn about a substantially vertical axis and adapted to be mounted above and in front of the transmission gearing, a tubular housing connected with said bracket extending rearwardly and upwardly therefrom, a rod passing through said tubular housing, a lever pivotally mounted between its ends at the rear end of said tubular housing having the rear end of said rod pivotally connected thereto at one end of the lever, a second lever pivotally mounted at the forward side of said support to turn about a horizontal axis, to the upper end of which the forward end of said rod is connected, a second rod connected to the lower end of said second lever extending to and having operative connection with said rock shaft of the transmission to rock the same on longitudinally moving the first rod by pivotally operating the first mentioned lever, and a third rod connected to said support outwardly and to one side of the vertical axis of said support, said third rod extending to and having connection to the transmission whereby longitudinal movement of the third rod imparted by a pivotal movement of said support will longitudinally move the rock shaft against said spring.

7. A gear shifting attachment adapted to be connected with a sliding gear transmission and mounted upon the body of a motor vehicle, said body having a vertical dash at the front of the driving compartment and an instrument panel located upwardly of and back of the dash and over the transmission gearing, said attachment comprising, a bracket member adapted to be mounted upon said dash to turn about a substantially vertical axis, an elongated member connected to said bracket adapted to extend rearwardly with its rear end portion lying slightly below and closely adjacent the lower edge of said instrument panel whereby said elongated member may be laterally moved at its rear end to turn said bracket about its axis, means connected with the bracket and adapted to be operatively joined with the transmission gearing for controlling the selection of the sliding gear to be operated on pivotal movement of said bracket, a manually operable member movably mounted at the rear end of said elongated member, and means connected therewith and movably connected with said bracket and operatively connected with the transmission gearing for shifting the selected gear upon manual operation of said movably mounted member carried by the elongated member.

8. A gear shifting appliance adapted to be connected with a sliding gear transmission of a motor vehicle and adapted to be mounted upon the body of said vehicle, which body has a vertical dash and an instrument panel located upwardly and rearwardly of the dash over said transmission gearing, said attachment comprising, a bracket adapted to be pivotally mounted at the forward side of said dash to turn about a substantially vertical axis, a connection to said bracket adapted to be operatively associated with said sliding gear transmission to effect a selection of a gear to be shifted on pivotal movement of said bracket, an elongated member connected to said bracket and adapted to pass through said dash and terminate at its rear end adjacent the lower edge of said instrument panel, a lever pivotally mounted on the forward side of said bracket, means connected to one end of the lever adapted to be operatively associated with said transmission gearing to shift a selected gear in opposite directions by moving said lever about its pivot in opposite directions, a rod connected to the other end of the lever paralleling said elongated member, and a manually operated lever pivotally mounted between its ends at the rear end of said elongated member to one end of which said rod is pivotally connected, as and for the purposes specified.

ANTHONY VANDERVELD.